Figure 5:
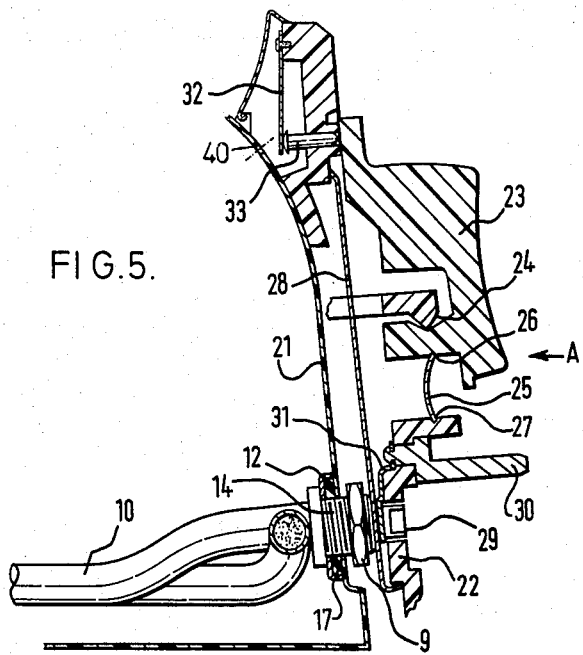
Figure 6:
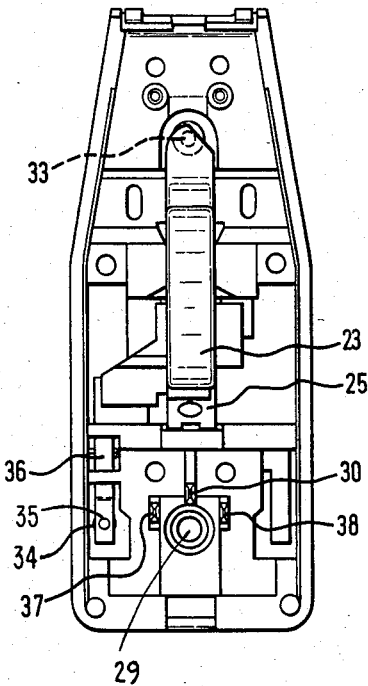

United States Patent [19]

Inskip et al.

[11] Patent Number: 4,510,375
[45] Date of Patent: Apr. 9, 1985

[54] ELECTRIC IMMERSION HEATER ASSEMBLY FOR LIQUID HEATING APPLIANCES

[75] Inventors: Michael Inskip, Stoke on Trent; Alan Warren, Western Downs, both of England

[73] Assignee: Ti Russell Hobbs Limited, United Kingdom

[21] Appl. No.: 380,445

[22] Filed: May 20, 1982

[30] Foreign Application Priority Data

May 28, 1981 [GB] United Kingdom ............... 8116219

[51] Int. Cl.³ .................. H05B 1/02; H05B 3/82; A47J 27/21
[52] U.S. Cl. .................. 219/328; 219/316; 219/318; 219/336; 219/437; 219/441; 219/523; 219/536
[58] Field of Search .................. 219/436–438, 219/441, 442, 328, 331, 335, 336, 316, 318, 523, 536

[56] References Cited

U.S. PATENT DOCUMENTS

| | | | |
|---|---|---|---|
| 3,187,163 | 6/1965 | Wells et al. | 219/441 |
| 3,277,277 | 10/1966 | Wells | 219/328 X |
| 3,303,327 | 2/1967 | Himelsbaugh | 219/437 X |
| 3,728,517 | 4/1973 | Tilp | 219/316 |

FOREIGN PATENT DOCUMENTS

| | | |
|---|---|---|
| 245031 | 5/1963 | Australia . |
| 257716 | 12/1963 | Australia . |
| 402966 | 7/1966 | Australia . |
| 401909 | 10/1967 | Australia . |
| 442465 | 10/1970 | Australia . |
| 6144880 | 8/1980 | Australia . |
| 2428953 | 5/1979 | France . |
| 795547 | 5/1958 | United Kingdom | 219/331 |
| 821024 | 9/1959 | United Kingdom | 219/328 |
| 1316436 | 5/1973 | United Kingdom | 219/437 |
| 1321825 | 7/1973 | United Kingdom . |
| 1353073 | 5/1974 | United Kingdom . |
| 1382052 | 1/1975 | United Kingdom | 219/336 |
| 1415843 | 11/1975 | United Kingdom . |
| 1557003 | 12/1979 | United Kingdom | 219/437 |
| 2022380 | 12/1979 | United Kingdom . |
| 2040572 | 8/1980 | United Kingdom | 219/328 |

Primary Examiner—A. Bartis
Attorney, Agent, or Firm—Leydig, Voit, Osann, Mayer and Holt, Ltd.

[57] ABSTRACT

The immersion heater for an appliance includes a mounting plate, a metal sheathed electrical resistance heating element having two end portions which extend through and which are secured to the mounting plate, and a single fastening device for fixing the mounting plate to the body shell of the appliance. The fastening device comprises a threaded heat conductive stud secured to the mounting plate and a nut having a complementary thread. A raised part of the active portion of the heating element is directly secured to and only to the stud, such as by brazing. A bimetallic element is fixed directly to the stud on the outside of the body shell. The stud provides a heat conductive path between the heating element and the bimetallic element. The bimetallic element bends when the appliance is energized 'dry' or when the liquid has boiled down to the element and pushes a dolly overcenter to open a pair of contacts and de-energize the heating element. The appliance is, preferably, an electric kettle provided with a further bimetallic element which switches off the kettle when water therein boils.

16 Claims, 6 Drawing Figures

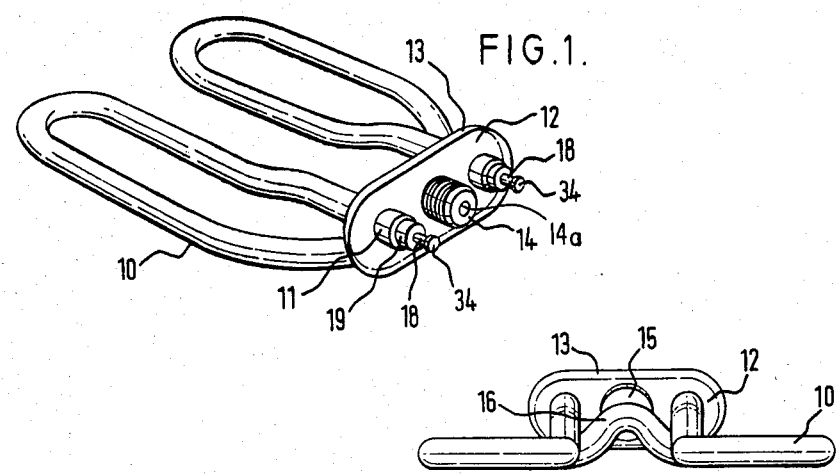
FIG.1.
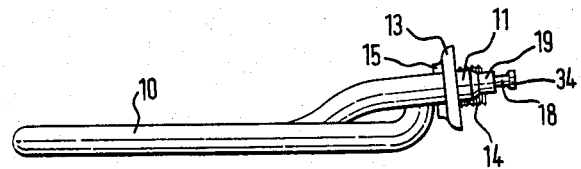
FIG.2.
FIG.3.
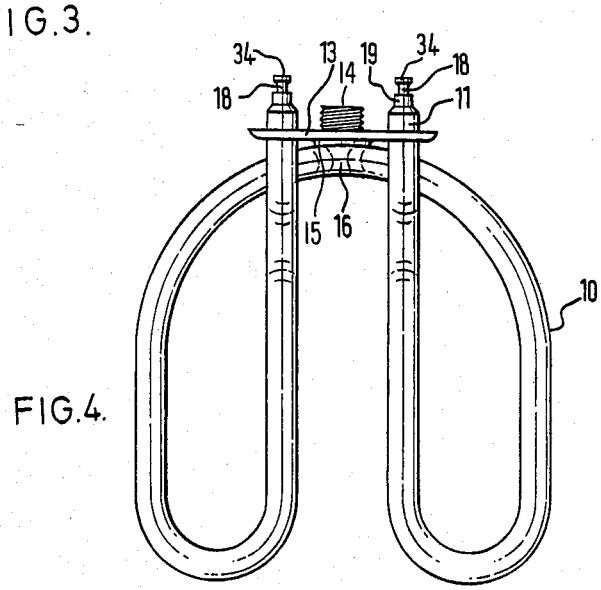
FIG.4.

ELECTRIC IMMERSION HEATER ASSEMBLY FOR LIQUID HEATING APPLIANCES

This invention relates to electrical immersion heaters and to liquid heating appliances including such heaters and has particular although not exclusive reference to electric kettles.

Conventionally, in an electric kettle the immersion heater comprises an element having a length of resistance wire contained in and insulated from a metal sheath bent into a convoluted form and whose ends are located in a mounting plate by means of which the element is mounted on the wall of the kettle. The mounting plate is secured to the wall in a manner which allows the plate to be uncoupled if it becomes necessary to replace the heater. A path is also provided along which heat is readily conveyed to a safety cut-out device in the event that the element overheats due, for example, to dangerous loss of liquid by evaporation or to the element being energised without an adequate volume of liquid in the kettle.

According to a first aspect of the invention, there is provided an electrical immersion heater for a liquid heating appliance, comprising a mounting plate, a metal sheathed heating element having two end portions which extend through and which are secured to the mounting plate, and a single fastening device for securing the mounting plate and hence the element to a body shell of the appliance, at least part of the single fastening device being thermally conductive and a part of an active portion of the heating element being directly connected to and only to the at least part of the fastening device.

Preferably, said part of the fastening device is a heat conductive stud secured to the mounting plate. In this case, preferably, the stud is threaded and co-operates with a nut having a complementary thread, and, advantageoously, the stud is positioned on the mounting plate between the two end portions of the heating element.

Preferably, the stud has a threaded axially extending blind hole for receiving a threaded fastener, whereby a bimetallic device can be fixed directly to the stud.

Preferably, a part of the active portion of the heating element is secured, such as by brazing, to the at least part of the fastening device.

Advantageously, said part of the active portion of the element is raised above the rest of the active portion of the element and, conveniently, in between inactive end portions of the heating element. Hence, in use, as liquid in the appliance boils down, the raised part of the heating element will overheat before the rest of the active portion of the heating element.

According to a second aspect of the invention, there is provided a liquid heating appliance, e.g. an electric kettle, provided with an electrical immersion heater according to the first aspect of the invention, the mounting plate being fixed to the body shell of the appliance by the single fastening device.

Preferably, the liquid heating appliance has a safety cut-out device operable to protect the heating element against overheating, the at least part of the fastening device providing a heat conducting path between the heating element and the safety cut-out device.

According to a third aspect of the invention, there is provided an electric liquid heating appliance comprising a body shell, a heating element within the body shell and having two ends which project through the body shell to the outside thereof, a switch housing mounted on the outside of the body shell, a pair of switching contacts relatively movable between open and closed positions by a switch operating member supported by the switch housing, and a safety cut-out device operable to protect the heating element against overheating, wherein the heating element is fixed to the body shell by a single fastening device which is thermally conductive and which provides a heat conducting path between the heating element and the safety cut-out device.

Preferably, the safety cut-out device comprises a bi-metallic element fixed directly to the fastening device on the outside of the body shell.

Advantageously, the heating element is electrically connected to an earthing pin via the single fastening device.

The invention will now be more particularly described, by way of example, with reference to the accompanying drawings, wherein:

FIG. 1 is a perspective view of one embodiment of a heater according to the first aspect of the invention, FIG. 2 is a front view of the heater of FIG. 1, FIG. 3 is a side view of the heater of FIGS. 1 and 2, FIG. 4 is a plan view of the heater of FIGS. 1 to 3, FIG. 5 is a sectinal side view of part of one embodiment of an appliance according to the second and third aspects of the invention, and including the heater of FIGS. 1 to 4, and FIG. 6 is a view in the direction of arrow A in FIG. 5.

Referring to FIGS. 1 to 4 of the drawings, the electrical immersion heater shown therein comprises a metal sheathed heating element 10 of conventional construction. The element 10 is of convoluted shape and has two end portions 11 which extend through and are brazed to a metal mounting plate 12 having a peripheral rim 13.

A single fastening device, for fixing the mounting plate 12 and element 10 to the body shell of an appliance, comprises a threaded metal stud 14 and a nut 9 (see FIG. 5) with a complementary thread. The stud 14 extends through a hole which is provided in the mounting plate 12 between the two end portions 11 of the heating element 10. The stud has at one end a head 15 which is secured to the plate 12, such as by brazing, and a generally planar opposite end with an internally threaded blind bore 14a therein. The axis of the stud 14 lies in or is closely adjacent to the plane containing the axes of the end portions of the element 10.

The end portions 11 of the heating element 10 are inactive (i.e. do not contain a resistive element) whilst the rest of the heating element is active. The end portions 11 and a local region 16 in the centre of the active portion of the heating element 10 are raised above the rest of the heating element. The region 16 is raised in between the end portions 11 so as to be of short length and is secured in good heat conducting relationship directly to the head 15 of the stud 14, such as by brazing, and only to the head 15 of the stud 14, for a purpose which will become apparent later. The region 16 does not contact the mounting plate. Hence, heat from the region 16 is conducted directly into the stud 14.

The rim 13 permits the mounting plate to accommodate a resilient seal 17. The sheath of the element 10 is cut back at its ends to expose an inner conductor 18 and an insulating sleeve 19 is slipped over the exposed ends of the inner conductor.

Referring now to FIG. 5, the appliance as shown therein is an electric kettle 20 having a body shell 21 and a switch housing 22 mounted on the outside of the body shell 21. The housing 22 has a snap fit cover (not shown).

The end portions of the heating element 10 and the boss 14 extend through respective apertures formed in the body shell 21 and the mounting plate is fixed against the inner wall of the body shell 12 by a lock washer and the nut 9, the thread of which co-operates with the thread on the boss 14. The seal 17 is interposed between the plate 12 and the inner wall of the body shell and this is compressed by the nut 9 to provide a watertight seal. The two end portions of the heating element, projecting through respective apertures in the body shell, will prevent rotation of the heating element relative to the body shell.

A switch assembly includes a dolly 23 and a pair of switching contacts 34 and 35 (see FIG. 6) relatively movable by the dolly between open and closed positions. The contact 34 is fixed to the exposed inner conductor at one end 11 of the element 10 and the contact 35 is fixed to a resilient leaf 36. The dolly 23 rocks about a pivot 24 integral with the switch housing 22. The dolly 23 is urged into engagement with the pivot 24 by a leaf spring 25 seated at one end in a recess 26 provided in the dolly and at an opposite end in a recess 27 provided in the switch housing 22.

In a first position of the dolly 23, the aforesaid switching contacts are open and in a second position of the dolly 23 they are closed to complete an electrical circuit, which includes the heating element 10, between terminal pins 37 and 38.

The kettle also includes a safety cut-out device operable to protect the heating element 10 against over-heating. The cut-out device comprises a bi-metallic element 28 which is fixed in good heat conductive relationship directly to the generally planar outer end of the stud 14 by a fastener 29 provided with an externally threaded portion which engages the internally threaded, blind bore 14a in the outer end of the stud 14. Heat will be conducted from the heating element 10 to the bi-metallic element 28 by the stud 14. Under normal use of the kettle, when the element 10 is fully immersed in water, the bi-metallic element 28 will heat up and bend to an insufficient degree to move the dolly from its second to its first position. However, under abuse conditions i.e. when the appliance is energised "dry" or when the liquid has boiled/evaporated down to the element, the raised localised region 16 of the element will overheat before the rest of the active portion of the heating element and its heat will be conducted to the bi-metallic element 28 by the stud 14. The bi-metallic element 28 will bend to such an extent that it pushes the dolly 23 "over-centre" and the leaf spring 25 will then continue to move the dolly to its first position to thereby open the switching contacts and interrupt the electrical supply to the heating element. To re-energise the heating element 10 it will be necessary for a user to operate the dolly. Hence, unlike most electric kettles it will not cycle on and off under abuse condition. Because the localised portion 16 is secured directly to the head 15 and only the head 15, and because the bimetallic element 28 is fixed directly to the outer end of the stud 14, the heat loss between the portion 16 and the element 28 will be minimised.

Moreover, the sheath of the heating element is electrically connected to an earthing pin 30 by way of the stud 14 and a connection strap 31 which is held in tight engagement with the bi-metallic element 28 by the fastener 29.

The switch housing 22 is fixed to the body shell 21 by a screw which engages with an internally threaded blind bore in the head of the fastener 29.

The single fastening device serves three functions, namely to fasten the heating element to the body shell, to earth the heating element, and to conduct heat from the heating element to the safety cut-out device.

The kettle is of an automatic type which has a further bi-metallic element 32 which through the intermediary of a push rod 33 rocks the dolly to its first position when water in the kettle boils and steam through the hole 40 heats the bimetallic element 32, thereby opening the switching contacts and hence interrupting the power supply to the heating element.

In addition to a kettle as described, the invention can be applied to tea-makers, milk-warmers, coffee percolators, immersion heaters, and other kinds of electric heating appliances.

What is claimed is:

1. An electrical immersion heater for a liquid heating appliance, comprising a mounting plate, a metal sheathed heating element having two end portions which extend through an opening in and which are secured to the mounting plate and an active heating portion between the end portions, and a single fastening device for fixing the mounting plate and hence the heating element to a body shell of the appliance, at least part of the fastening device including a thermally conductive stud secured to said mounting plate so as to project to the outside of the body shell for acting as a heat conductor from the heating element to a safety cut-out device for the appliance supported on the outside of the body shell, and a part of the active portion of the heating element being directly connected only to said thermally conductive stud of said fastening device.

2. The heater of claim 1, wherein the stud is externally threaded and the fastening device also includes a nut having a complementary thread.

3. The heater of claim 1 or claim 2, wherein the stud is positioned on the mounting plate between the two end portions of the heating element.

4. The heater of claim 1, wherein the stud has a threaded axially extending blind hole for receiving a threaded fastener, whereby a bimetallic device of a safety cut-out device for the appliance can be fixed directly to the stud.

5. The heater of claim 1, wherein the part of the active portion of the heating element is raised above the rest of the active portion of the heating element.

6. The heater of claim 5, wherein the part of the active portion of the heating element is raised in between inactive end portions of the heating element.

7. An electric liquid heating appliance, comprising a body shell, a heating element removably mounted within the body shell, the element having two ends projecting through an opening in the body shell to the outside thereof, a switch housing mounted on the outside of the body shell, a switch operating member mounted in the switch housing, a pair of switching contacts located within said housing and being relatively movable between open and closed positions by the switch operating member, said switching contacts being connected in series with said heating element for controlling the flow of electric power therethrough, and a safety cut-out device mounted in the switch housing and operable in response to overheating of said heating element to engage and shift the switch operating member to open said switching contacts and protect the heating element, mounting means connected to the heating element for securing the heating element within the body shell, said mounting means including a single fastening device connected to fix said heating element to the body shell, said single fastening device being thermally conductive and in good heat exchange relationship with the active heating portion of the heating element within the body shell and having an element projecting to the outside of the body shell into the switch housing and providing a heat conducting path between the heating element and the safety cut-out device.

8. The appliance of claim 7, wherein the safety cut-out device comprises a bi-metallic element and means are provided for fixing the bimetallic element directly to the projecting element of the fastening device on the outside of the body shell, the bimetallic element being operable when the element overheats to open the contacts by moving the switch operating member.

9. The appliance of claim 7 or claim 8, wherein said single fastening device is electrically conductive and an earthing pin is electrically connected to the heating element via the single fastening device.

10. The appliance of claim 7, wherein the housing has an integral pivot about which the switch operating member is movable.

11. The appliance of claim 7, wherein one of the contacts is fixed and is provided on one end of the heating element and the other contact is movable.

12. The appliance of claim 7, wherein said mounting means includes a mounting plate to which the heating element is secured, and the fastening device comprising a threaded heat conductive stud secured to the mounting plate forming said projecting element and a nut with a complementary thread, a part of the active portion of the heating element being directly connected only to the stud.

13. The appliance of claim 12, wherein the part of the active portion of the heating element is raised above the rest of the active portion of the heating element.

14. The appliance of claim 13, wherein the part of the active portion of the heating element is raised in between said ends of the heating element.

15. The appliance of claim 7, further comprising a bimetallic element for moving the switch operating member to open the contacts in response to water in the appliance boils.

16. An electrical immersion heater for a liquid heating appliance comprising a mounting plate, a metal sheathed heating element having two end portions which extend through and which are secured to the mounting plate and an active heating portion between the end portions, and a single fastening device for fixing the mounting plate and hence the heating element to a body shell of an appliance, at least part of the fastening device including a thermally conductive stud secured to said mounting plate between the two end portions of the heating element for acting as a heat conductor from the heating element to a safety cut-out device, and a part of the active portion of the heating element being directly connected only to said thermally conductive stud of said fastening device.

* * * * *